(12) United States Patent
Koizumi et al.

(10) Patent No.: US 11,644,976 B2
(45) Date of Patent: May 9, 2023

(54) TRANSMISSION CONTROL METHOD AND TRANSMISSION CONTROL SYSTEM

(71) Applicant: Hitachi, Ltd., Tokyo (JP)

(72) Inventors: Sota Koizumi, Tokyo (JP); Naoki Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/473,923

(22) Filed: Sep. 13, 2021

(65) Prior Publication Data

US 2022/0261159 A1    Aug. 18, 2022

(30) Foreign Application Priority Data

Feb. 18, 2021  (JP) .............................. JP2021-024672

(51) Int. Cl.
  *G06F 3/06*  (2006.01)
  *G06F 13/42*  (2006.01)

(52) U.S. Cl.
  CPC .......... *G06F 3/0613* (2013.01); *G06F 3/0655* (2013.01); *G06F 3/0676* (2013.01); *G06F 13/4221* (2013.01); *G06F 2213/0026* (2013.01)

(58) Field of Classification Search
  CPC .... G06F 3/0613; G06F 3/0655; G06F 3/0676; G06F 13/4221; G06F 2213/0026
  See application file for complete search history.

(56) References Cited

U.S. PATENT DOCUMENTS

2006/0075188 A1*  4/2006  Matsushige ........... G06F 3/0604
                                                711/114
2017/0207952 A1   7/2017  Ogawa et al.
2019/0164594 A1*  5/2019  Eom ........................ G11C 7/14

FOREIGN PATENT DOCUMENTS

| JP | 2003-234788 A | 8/2003 |
| JP | 2004-289388 A | 10/2004 |
| JP | 2009-124701 A | 6/2009 |
| JP | 2017-129969 A | 7/2017 |
| JP | 2018-207444 A | 12/2018 |

OTHER PUBLICATIONS

Japanese Office Action dated Oct. 4, 2022 for Japanese Patent Application No. 2021-024672.

* cited by examiner

*Primary Examiner* — Ernest Unelus
(74) *Attorney, Agent, or Firm* — Volpe Koenig

(57) ABSTRACT

A transmission control method includes: determining transmission performance in a transmission line by using a parameter that determines a size of an opening of an eye pattern; and adjusting a transmission parameter that is a parameter having an influence on transmission quality in the transmission line on the basis of a result of the determination.

10 Claims, 6 Drawing Sheets

FIG. 3

THRESHOLD TABLE 71

| Device Number | Signal name | Eye Top | Eye Bottom | Eye Right | Eye Left |
|---|---|---|---|---|---|
| IC1 | PCIE0_Rx0 | 22.1 | 22.1 | 10.5 | 10.5 |
| | PCIE0_Rx1 | 22.1 | 22.1 | 10.5 | 10.5 |
| | PCIE0_Rx2 | 22.1 | 22.1 | 10.5 | 10.5 |
| | PCIE0_Rx3 | 22.1 | 22.1 | 10.5 | 10.5 |
| | PCIE0_Rx4 | 22.1 | 22.1 | 10.5 | 10.5 |
| | PCIE0_Rx5 | 22.1 | 22.1 | 10.5 | 10.5 |
| | PCIE0_Rx6 | 22.1 | 22.1 | 10.5 | 10.5 |
| | PCIE0_Rx7 | 22.1 | 22.1 | 10.5 | 10.5 |
| IC2 | PC3E_Rx0 | 137.5 | . | . | . |
| | PC3E_Rx1 | 137.5 | . | . | . |
| | PC3E_Rx2 | 137.5 | . | . | . |
| | ... | ... | ... | ... | ... |

MEASURED VALUE TABLE 72

| Device Number | Signal name | Eye Top | Eye Bottom | Eye Right | Eye Left |
|---|---|---|---|---|---|
| IC1 | PCIE0_Rx0 | 50 | -58 | 14 | -16 |
| | PCIE0_Rx1 | 56 | -42 | 14 | -16 |
| | PCIE0_Rx2 | 50 | -44 | 12 | -17 |
| | PCIE0_Rx3 | 52 | -56 | 13 | -16 |
| | PCIE0_Rx4 | 58 | -52 | 13 | -17 |
| | PCIE0_Rx5 | 46 | -50 | 12 | -18 |
| | PCIE0_Rx6 | 54 | -56 | 15 | -18 |
| | PCIE0_Rx7 | 62 | -50 | 14 | -14 |
| IC2 | PC3E_Rx0 | 137.5 | . | . | . |
| | PC3E_Rx1 | 162.5 | . | . | . |
| | PC3E_Rx2 | 187.5 | . | . | . |
| | ... | ... | ... | ... | ... |

FIG. 4

PERIOD TABLE 73

| Device Number | Signal name | PERIOD T | NUMBER OF TIMES OF SETTING i |
|---|---|---|---|
| IC1 | PCIE0_RX0 | 30 | 0 |
| | PCIE0_RX1 | 60 | 1 |
| | PCIE0_RX2 | 30 | 0 |
| | PCIE0_RX3 | 60 | 1 |
| | PCIE0_RX4 | 30 | 0 |
| | PCIE0_RX5 | 60 | 1 |
| | PCIE0_RX6 | 30 | 0 |
| | PCIE0_RX7 | 60 | 1 |
| IC2 | PC3E_RX0 | 90 | 3 |
| | PC3E_RX1 | 120 | 4 |
| | PC3E_RX2 | 120 | 4 |
| | ... | ... | ... |

TRANSMISSION CONTROL METHOD AND TRANSMISSION CONTROL SYSTEM

BACKGROUND OF THE INVENTION

1. Field of the Invention

The present invention relates to a transmission control method and a transmission control system.

2. Description of the Related Art

In the related art, for example, in a storage system, it is known that quality of transmission signal between devices deteriorates due to breakage of a cable or deterioration thereof with the passage of time. In addition, it is also known that failure caused by the cable occurs. Here, as a technology for coping with such a situation, JP 2017-129969 A discloses a technology of performing route diagnosis without affecting system operation.

JP 2017-129969 A discloses a storage system that includes two controllers, four IO modules, and two storage devices, and performs a process of reading-out or writing of data, and the like with respect to a storage device corresponding a volume in correspondence with an input or output request (for example, a read command or a write command) made with respect to the volume from a host device that is a higher-level device. In addition, the controllers have a diagnostic function of diagnosing a data transmission route (diagnosis target route) through which data transmission and data reception to and from the IO modules are performed, and determine that a status corresponds to which one status among three kinds of "a normal status", "a status in which preventive replacement is required", and "a status in which replacement is required" by a combination of collected equalizer variables.

However, in high-speed transmission connecting devices (for example, high-speed transmission related to PCIe), even when using the technology disclosed in JP 2017-129969 A, it is difficult to appropriately monitor the sign of occurrence of a failure during system operation, and as a result, it is considered that transmission quality except when the failure occurs is not secured, and performance or redundancy of the system may deteriorate as a whole.

SUMMARY OF THE INVENTION

Here, an object of the invention is to provide a transmission control method and a transmission control system which are capable of appropriately monitoring and coping with the sign of occurrence of a failure, and are capable of suppressing deterioration of performance or redundancy of a system as a whole.

According to a first aspect of the invention, there is provided the following transmission control method. That is, the transmission control method includes: determining transmission performance in a transmission line by using a parameter that determines a size of an opening of an eye pattern; and adjusting a transmission parameter that is a parameter having an influence on transmission quality in the transmission line on the basis of a result of the determination.

According to a second aspect of the invention, the following transmission control system is provided. That is, the transmission control system includes a storage unit and a first controller. The first controller is connected to a first transmission line that connects a host as a higher-level device and the storage unit. The first controller executes an adjustment processing program, determines transmission performance in the first transmission line by using a parameter that determines a size of an opening of an eye pattern, and adjusts a transmission parameter that is a parameter having an influence on transmission quality in the first transmission line on the basis of a result of the determination.

According to the aspect of the invention, there are provided a transmission control method and a transmission control system which are capable of appropriately monitoring and coping with the sign of occurrence of a failure, and are capable of suppressing deterioration of performance or redundancy of a system as a whole.

BRIEF DESCRIPTION OF THE DRAWINGS

FIG. 3 is an example of data (a threshold table, and a measured value table) used in this embodiment;

FIG. 4 is an example of data (period table) used in this embodiment;

DETAILED DESCRIPTION OF THE PREFERRED EMBODIMENTS

Figure 1:
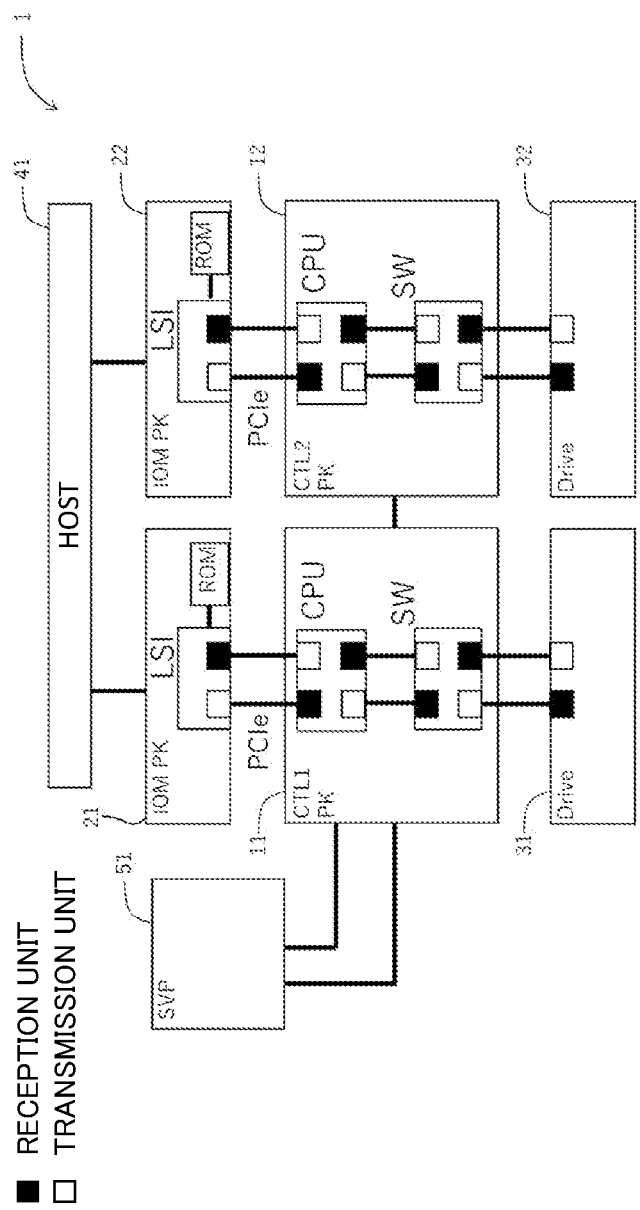
FIG. 1 is a system block diagram for describing a storage system of this embodiment.

A configuration of a storage system of this embodiment will be described with reference to FIG. 1. A storage system 1 (transmission control system) includes a first controller 11 (an electronic calculator), a second controller 12, a first IO device 21, a second IO device 22, and a storage unit. The storage unit can be constructed by an appropriate storage device (for example, a hard disk drive), and is constructed by two storage devices (a first storage device 31 and a second storage device 32) in this embodiment.

The first controller 11 includes a CPU and a switch (SW), and is provided in a transmission line (a first transmission line) connecting a host 41 that is a higher-level device and the first storage device 31. The first IO device 21 includes an LSI (constructed by a chip set in this embodiment) and a ROM, and is provided between the first controller 11 and the host 41.

A reception unit that is used to input data to the first controller 11 and a transmission unit that is used to output data from the LSI of the first IO device 21 are connected to each other on the transmission line (the first transmission line). In addition, a transmission unit that is used to output data from the first controller 11 and a reception unit that is used to input data to the LSI of the first IO device 21 are connected to each other on the transmission line (the first transmission line). Note that, in this embodiment, connection between the first controller 11 and the first IO device 21 is set as connection based on PCIe.

The SW of the first controller 11 is configured to stop data input to the first controller 11 and data output from the first controller 11 in correspondence with a situation, and is provided to be controlled by the CPU of the first controller 11. In a case where data input and output to and from the first controller 11 are stopped, data transmission on the transmission line (the first transmission line) is stopped.

The second controller 12 has a similar configuration as in the first controller 11. That is, the second controller 12 includes a CPU and a switch (SW). In addition, the second controller 12 is provided on a transmission line (a second transmission line) connecting the host 41 and the second storage device 32. The second IO device 22 includes an LSI (constructed by a chip set) and a ROM as in the first IO device 21, and is provided between the second controller 12 and the host 41. Connection between the second controller 12 and the second IO device 22 is set as connection based on the PCIe.

The SW of the second controller 12 is configured to stop data input to the second controller 12 and data output from the second controller 12 in correspondence with a situation, and is provided to be controlled by the CPU of the second controller 12. In a case where data input and output to and from the second controller 12 are stopped, data transmission on the transmission line (the second transmission line) is stopped.

In this embodiment, the first controller 11 and the second controller 12 are capable of communicating with each other. In addition, in the storage system 1, a service processor 51 configured to perform system monitoring is connected to the storage system 1. Note that, the service processor 51 is connected to the first controller 11 in FIG. 1, but the service processor 51 may be connected to a controller different from the first controller 11, or may be connected to a plurality of controllers.

Figure 2:
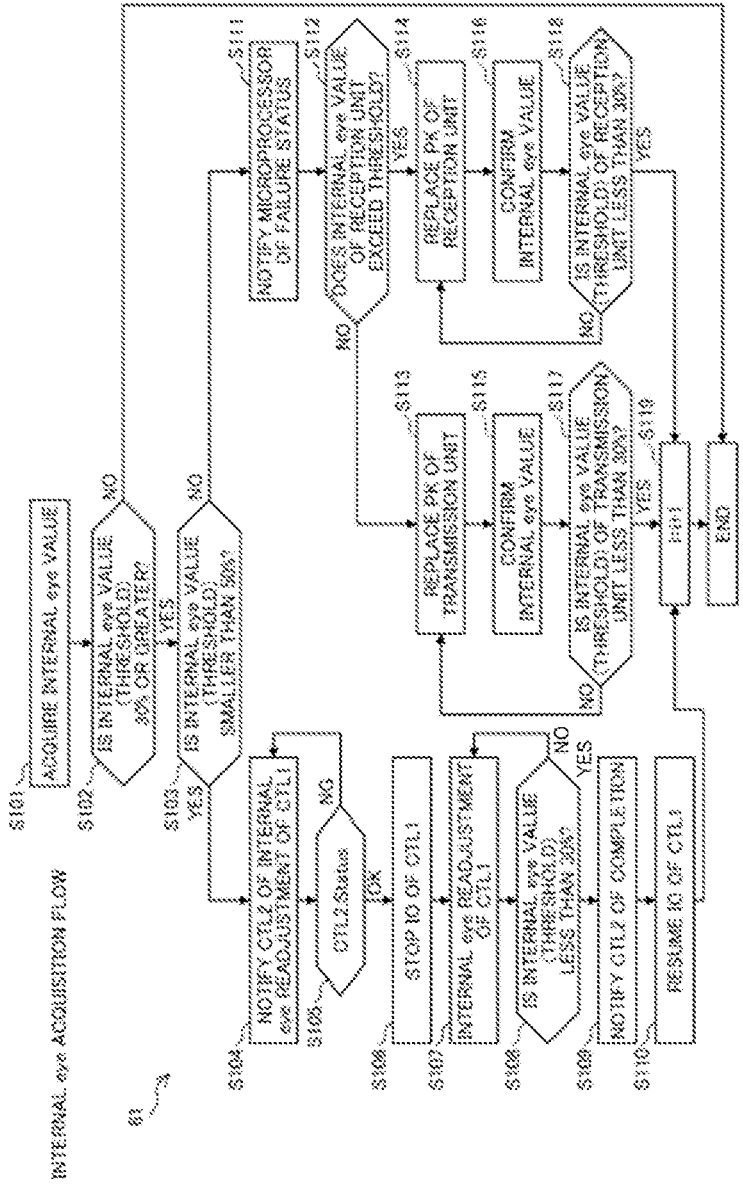
FIG. 2 is a flowchart for describing a process of an adjustment processing program.

In the storage system 1 of this embodiment, as an example, a status of a transmission line between a controller and an IO device is monitored, and control corresponding to the status is executed. Next, the control will be described in detail with reference to FIG. 2. FIG. 2 is a flowchart for describing a process of an adjustment processing program.

The controller measures an eye pattern of the transmission line between the controller and the IO device, and acquires an internal eye value (S101). For example, the first controller 11 executes an adjustment processing program 61 to measure an eye pattern of the transmission line between the first controller 11 and the first IO device 21 and to acquire an internal eye value of the transmission line. On the other hand, the second controller 12 executes the adjustment processing program 61 to measure an eye pattern of the transmission line between the second controller 12 and the second IO device 22 and to acquire an internal eye value of the transmission line. Note that, timing of acquiring the internal eye value (in other words, timing of performing a process in S101) can be appropriately determined, and in this embodiment, the timing is determined by execution of an autonomous control processing program 62 to be described later, and the internal eye value is acquired.

Here, the above-described internal eye value will be described in detail. The internal eye value is a parameter that determines the size of an opening of the eye pattern. The internal eye value may appropriately evaluate the size of the opening of the eye pattern, and a calculation method thereof is not particularly limited. In this embodiment, the internal eye value is calculated on the basis of data prepared in advance and data that is actually measured and acquired.

That is, as shown in FIG. 3, data (in FIG. 3, a threshold table 71) that determines an opening of a satisfactory eye pattern is prepared. For example, this data can be set as data based on a vendor specification (that is, preferred specifications in a vendor that provides a service or the like). In addition, data acquired from an actually measured eye pattern (in FIG. 3, a measured value table 72), and prepared data are compared with each other, and the internal eye value is calculated as a percentage (%) on the basis of the viewpoint as to whether or not it is similar to an eye pattern determined by the prepared data.

Here, in this embodiment, as the value of the percentage (%) is smaller (that is, as the internal eye value is smaller), this indicates that an opening of the measured eye pattern is similar to an opening of the eye pattern determined by the prepared data (that is, indicates that the opening of the eye pattern is opened in a satisfactory manner). In contrast, as the value of the percentage (%) is larger (that is, as the internal eye value is larger), this indicates that the opening of the measured eye pattern is not similar to the opening of the eye pattern determined by the prepared data (that is, indicates that the opening of the eye pattern is not opened in a satisfactory manner).

As shown in FIG. 3, in this embodiment, in the threshold table 71 that is prepared data, data (in FIG. 3, as an example, data of a length in each of top, bottom, right, and left with a representative central position of the opening set as a reference) that determines the size of the opening of the eye pattern is provided for every kind of a signal. In addition, even in the measured value table 72, data that determines the opening of the eye pattern is provided for every kind of the signal so as to correspond to the threshold table 71. Accordingly, in this embodiment, the internal eye value can be acquired for every kind of the signal.

As an example, the internal eye value may be calculated on the basis of a height of the opening (that is, a vertical length of the opening), and a width of the opening (that is, a horizontal length of the opening), and according to this, a reasonable internal eye value is calculated. However, the internal eye value may be calculated by a method different from the calculation method (for example, by using only the height of the opening). In addition, comparison with the prepared data may be omitted, and the internal eye value may be directly calculated from measured data.

The controller determines whether or not the internal eye value is 30% or greater (S102). In a case where the internal eye value is not 30% or greater, the process of the adjustment processing program 61 is terminated. On the other hand, in a case where the internal eye value is 30% or greater, a process in S103 is executed.

That is, the controller determines whether or not the internal eye value corresponding to the processing condition in S102 is smaller than 50% (S103). Here, in a case where it is determined that the internal eye value is smaller than 50%, a process in S104 is executed. On the other hand, in a case where the internal eye value is 50% or greater, a process in S111 is executed.

In the process in S103, in a case where it is determined that the internal eye value is smaller than 50%, the controller adjusts a transmission parameter so that the internal eye value becomes smaller than 30%. Here, the transmission parameter is a parameter having an influence on transmission quality in the transmission line.

When adjusting the transmission parameter, first, the controller gives a notification to another controller (S104). For example, in a case where the first controller 11 acquires the internal eye value equal to or greater than 30% and less than 50%, a notification is given to the second controller 12. Note that, in the following description, a controller that receives the notification in the process in S104 may be referred to as a notification receiving controller.

The controller receives data from the controller (notification receiving controller) to which the notification is given in the process in S104, and confirms an operation status of the notification receiving controller (S105). That is, the controller confirms whether or not transmission between the host 41 and the storage unit (in this embodiment, the second storage device 32) is established in the transmission line on the notification receiving controller side without performing adjustment of the transmission parameter by the notification receiving controller.

Note that, in the process in S104 and the process in S105, direct communication between the controllers may be performed, and communication through the service processor 51 may be performed. In addition, in a case where it could be confirmed that the transmission between the host 41 and the storage unit is established without performing adjustment of the transmission parameter, a process in S106 is executed. On the other hand, in a case where the establishment is not confirmed, the process in S104 is executed again.

The controller stops data input and output (S106). That is, the CPU of the controller stops data input and output by controlling the SW, and stops data transmission in the transmission line. For example, in a case where the first controller 11 stops data input and output, data transmission in the first transmission line is stopped.

After stopping data input and output in the process in S106, the controller adjusts the internal eye value (S107). That is, the controller adjusts the transmission parameter so that the internal eye value determined as 30% or greater in the process in S102 becomes less than 30%. Here, the controller may adjust, for example, a parameter for adjusting a high-frequency component or a low-frequency component of a signal as the transmission parameter to adjust the internal eye value. In addition, the controller may adjust a parameter for adjusting a signal intensity as the transmission parameter to adjust the internal eye value.

After the internal eye value is adjusted in the process in S107, the controller confirms whether or not the adjusted internal eye value becomes less than 30% (S108). In a case where it cannot be confirmed that the internal eye value is less than 30%, the controller executes adjustment of the internal eye value again.

After confirming that the internal eye value is adjusted to less than 30%, the controller gives a notification to another controller (S109). In addition, the controller controls the SW to initiate data input and output so that data transmission in the transmission line can be performed (S110). Note that, after the process in S110, the following process in S119 is executed.

Next, description will be given of a process in a case where it is determined that the internal eye value is 50% or greater in the process in S103. In this case, the controller notifies a microprocessor (having a configuration corresponding to the service processor 51) of a failure status (S111). That is, the microprocessor is notified of a failure determination. In addition, the controller confirms whether or not the internal eye value on a reception unit side is 50% or greater (S112). For example, in a case where the internal eye value is 50% or greater in a transmission line that connects a transmission unit of the controller and a reception unit of an IO device, the controller confirms whether or not the internal eye value on the reception unit side of the IO device is 50% or greater. Note that, a user is notified of a result in the confirmation process in S112 by an appropriate method. For example, the confirmation result is output to an external device through the service processor 51, and the user is notified of the confirmation result.

In addition, package replacement of a reception unit of the controller or a transmission unit of the controller (that is, replacement in a package unit related to a target configuration) is performed by the user who has acquired the confirmation result. For example, in a case where the user has grasped that the internal eye value on the reception unit side is not 50% or greater from the confirmation result, the user performs package replacement of the transmission unit (S113). For example, in a case where the user has grasped that the internal eye value on the reception unit side is not 50% or greater in the transmission line that connects the transmission unit of the controller and the reception unit of the IO device, the user performs package replacement of the transmission unit of the controller. On the other hand, in a case where the user has grasped that the internal eye value on the reception unit side is 50% or greater from the confirmation result, the user performs package replacement of the reception unit (S114).

In addition, in a case where the transmission unit has been replaced in the process in S113, the internal eye value on the transmission unit side is confirmed (S115). In addition, in a case where the internal eye value is 30% or greater, the user is notified of the gist (S117), and the transmission unit is replaced again by the user. On the other hand, in a case where the internal eye value is less than 30%, a process in S119 is executed.

In a case where the reception unit has been replaced in the process in S114, the internal eye value on the reception unit side is confirmed (S116). In addition, in a case where the internal eye value is 30% or greater, the user is notified of the gist (S118), and the reception unit is replaced again by the user. On the other hand, in a case where the internal eye value is less than 30%, a process in S119 is executed.

In the process in S119, increment in the number of times of setting, that is, the number of times of setting the internal eye value of 30% or greater to normal (that is, setting of the internal eye value to less than 30%) is executed, and a result thereof is stored in a period table 73 to be described below. Next, the process in S119 will also be described while describing the period table with reference to FIG. 4.

The period table 73 stores data for every kind of the controller and the signal as in the threshold table 71 and the measured value table 72, and the period table 73 stores a period T and the number of times of setting i for every kind of the signal. Here, the period T is a period in which the internal eye value when a corresponding signal is transmitted is acquired through execution of the adjustment processing program 61. Note that, the period T may be appropriately set by the user, but in this embodiment, the period T is changed on the basis of the number of times of setting i through execution of the autonomous control processing program 62 to be described later.

With regard to the number of times of setting i in the period table 73, a value incremented in the process in S119 through execution of the adjustment processing program 61 is stored. Accordingly, in a state in which any process in S110, S117, and S118 is not executed by the adjustment processing program 61, a value of "0" is stored. In addition, in this state, in a case where any one process is executed, increment is executed in the process in S119, and a value of "1" is stored.

Figure 5:
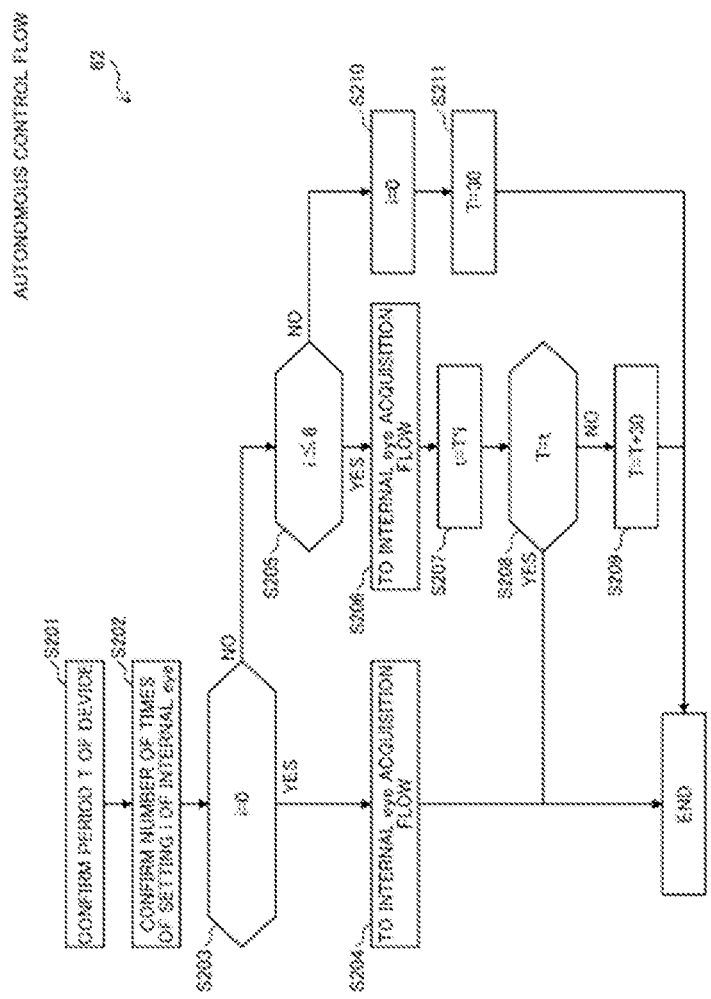
FIG. 5 is a flowchart for describing a process of an autonomous control processing program.

In this embodiment, timing at which the process of the adjustment processing program 61 is executed (in other words, initiation timing of S101) is determined by execution of the autonomous control processing program 62. In addition, due to execution of the autonomous control processing program 62, a process of acquiring and monitoring the internal eye value during system operation (that is, an autonomous control process) is performed, and automatic adjustment of the transmission parameter, a failure determination, and the like are executed in correspondence with a situation. Next, the process of the autonomous control processing program 62 will be described with reference to FIG. 5. FIG. 5 is a flowchart for describing the process of the autonomous control processing program.

The controller executes the autonomous control processing program 62, and confirms a period of a device (that is, the period T of each signal in the period table 73) (S201). In addition, the controller confirms the number of times of setting i of each signal which is stored in the period table 73 (S202). In addition, in a case where the number of times of setting i is "0" (S203), the adjustment processing program 61 is executed in the period T corresponding to the number of times of setting i in the period table 73, and the internal eye value is acquired (S204).

On the other hand, in a case where the number of times of setting i is not "0" (S203), a determination is made as to whether the number of times of setting i is 1 to 6 (S205), and in a case where the number of times of setting i is 1 to 6, the adjustment processing program 61 is executed in the period T corresponding to the number of times of setting i in the period table 73 and the internal eye value is acquired (S206). In addition to this, processes (S207 to S209) related to change of the period T is performed. In addition, in a case where the number of times of setting i is not 1 to 6 (that is, the number of times of setting i is 7), the adjustment processing program 61 is not executed, and a process of setting the number of times of setting i to "0" (S210) and a process of changing the period T (S211) are executed.

Here, the process of the autonomous control processing program 62 in the case of the period table 73 shown in FIG. 4 will be described in detail.

In the period table 73, since the number of times of setting i of PCIE_RX (0, 2, 4, 6) is "0", the controller (in FIG. 4, a controller on the IC1 side) acquires the internal eye value in the transmission line in the case of transmitting the signals at a period T (here, 30 minutes) corresponding to the signals, and makes a determination as to whether or not the internal eye value is less than 30%. Here, in a case where the internal eye value is smaller than 30%, the number of times of setting i on the period table 73 is not changed, and the process is performed again after 30 minutes.

On the other hand, in a case where the internal eye value is 30% or greater, and the processes in S110, S117, and S119 have been performed, the number of times of setting i on the period table 73 is incremented (that is, the number of times of setting i of PCIE_RX (0, 2, 4, 6) becomes "1"). In the subsequent process (that is, after 30 minutes), since the number of times of setting i of PCIE_RX (0, 2, 4, 6) is "1", the internal eye value is acquired and determined in S206. Here, in a case where the internal eye value is smaller than 30%, the number of times of setting i of PCIE_RX (0, 2, 4, 6) is not changed as "1", but in a case where the internal eye value is 30% or greater and increment has been performed in the process in S119, the number of times of setting i of PCIE_RX (0, 2, 4, 6) becomes "2".

In addition, the controller (in FIG. 4, the controller on the IC1 side) calculates the product of the period T and the number of times of setting i (S207), and determines whether or not a value of the product of the period T and the number of times of setting i and a value of an integer t match each other (S208). Here, the integer t is a parameter that is set in advance, and a value of the integer t can be selected from values of T, 2T, 3T, 4T, 5T, and 6T which are magnifications of the period T.

In a case where the number of times of setting i of PCIE_RX (0, 2, 4, 6) is "1", in the process in S207, t=T×1 is calculated, and the controller (in FIG. 4, the controller on the IC1 side) determines whether or not the calculated value matches the set integer t in the process in S208. On the other hand, in a case where the number of times of setting i of PCIE_RX (0, 2, 4, 6) is "2", t=T×2 is calculated in the process in S207, and the controller determines whether the calculated value matches the set integer t in the process in S208. In addition, in a case where the calculated value matches the set integer t, change of the period T is not performed. On the other hand, in a case where the calculated value does not match the set integer t, setting is performed so that the period T is lengthened. In the example in FIG. 4, a process of lengthening the period T by 30 minutes is performed in S209, and the period T of PCIE_RX (0, 2, 4, 6) on the period table 73 is changed (that is, in this example, the period T becomes 60).

Note that, in a case where the number of times of setting i is seven times (that is, the condition in S205 is not satisfied), a reset process of the number of times of setting and the period (initialization process) is performed. That is, the number of times of setting i that becomes seven times in the period table 73 becomes "0" (S210), and the corresponding period T is changed to 30 (S211).

Figure 6:
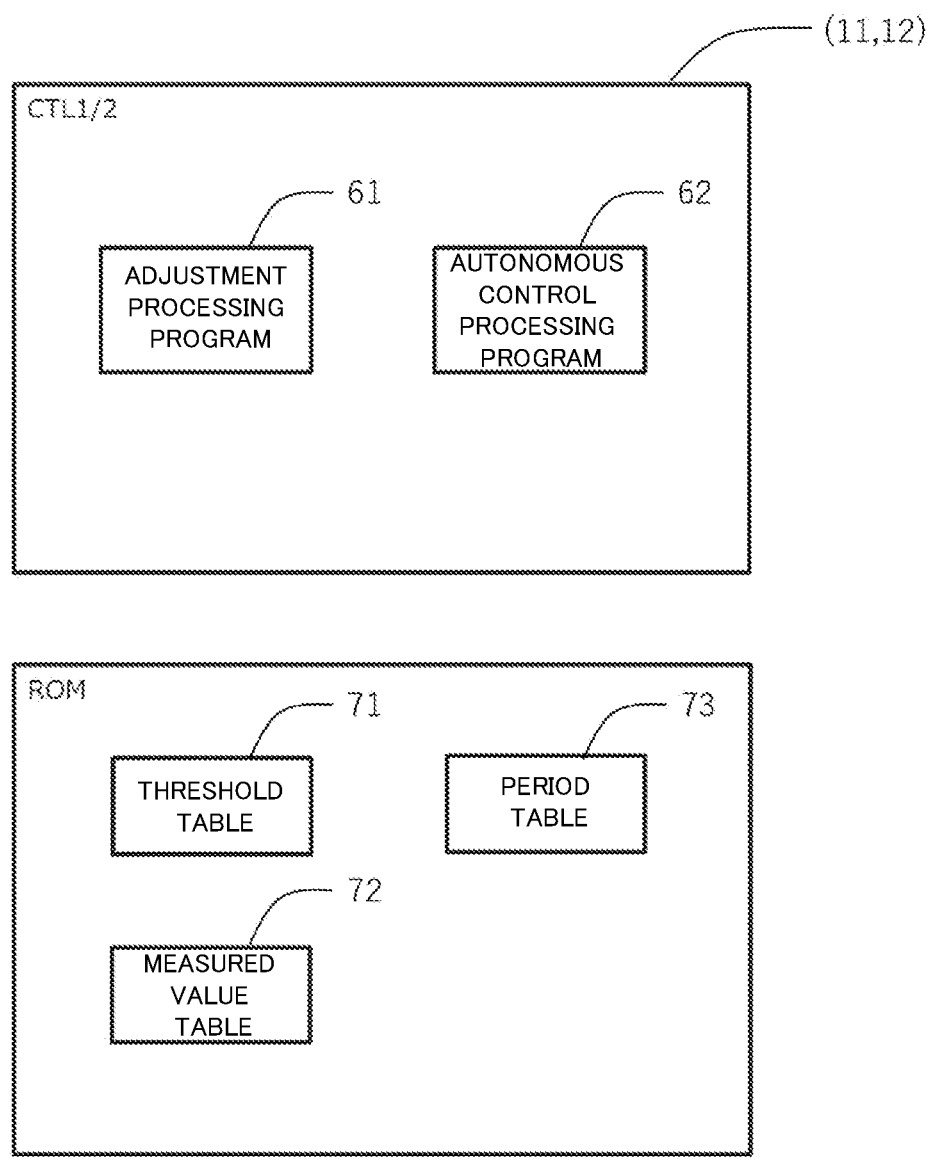
FIG. 6 is a view for describing a relationship between a program and data, and hardware in a storage system of this embodiment.

As illustrated in FIG. 6 (view for describing a relationship between a program and data, and hardware), the above-described adjustment processing program 61 may be appropriately executed by the CPU of the first controller 11 and the CPU of the second controller 12, and can be stored in an appropriate recording medium. This is also true of the autonomous control processing program 62. For example, a recording medium (for example, a ROM) may be provided in each of the first controller 11 and the second controller 12, and the program may be stored in each recording medium. Alternatively, a recording medium (for example, an externally attached HDD) may be provided at the outside of the first controller 11 or the second controller 12, and the program may be stored in the recording medium. Note that, in FIG. 6, each of the controllers is described as CTL1/2.

The threshold table 71, the measured value table 72, and the period table 73 may be appropriately used in the program processes described above, and may be stored in an appropriate recording medium. For example, a recording medium (for example, a ROM) may be provided in each device, and data related to the tables may be stored in the recording medium. Alternatively, the recording medium may be provided in a specific device (for example, the ROM may be provided in the controller), and data related to the tables may be stored in the recording medium. In addition, the recording medium may be provided in the service processor 51, and the tables may be stored in the recording medium.

In the above description, description has been given of a process (the process related to the adjustment processing program 61) of acquiring and adjusting the internal eye value in the transmission line between the controller and the IO device, but a similar process may be performed in a transmission line between the controller and the storage unit. In addition, even in this case, the process by the autonomous control processing program 62 may be performed.

In the above description, description has been given of a process using a reference value (a first reference value) of the internal eye value of 30% and a reference value (a second reference value) of the internal eye value of 50%. However, the magnitude of the reference value of the internal eye value may be appropriately changed as long as an appropriate determination can be made as to whether a transmission status is appropriate, whether adjustment of the transmission parameter is to be performed, or replacement of the reception unit or the transmission unit is to be performed. Here, the first reference value is a reference value of the internal eye value for making a determination as to whether or not the internal eye value is normal, and is a reference value used in the above-described process in S102 in this embodiment. The second reference value is a reference value of the internal eye value for making a determination as to whether the automatic adjustment process of the internal eye value is to be performed, or whether it is regarded as a device failure and a user or the like is notified of the gist, and is a reference value that is used in the above-described process in S103 in this embodiment. In addition, whether or not to include the reference values (for example, setting to the reference values or less, or less than the reference values) may be appropriately set as long as a threshold determination using the reference values of the internal eye value is performed.

The eye pattern can be measured by using an appropriate method. For example, a measurement device may be provided on the transmission line, and the eye pattern may be measured by using the measurement device.

In this embodiment, the storage unit is constructed by two storage devices (the first storage device 31 and the second storage device 32), but may be constructed by three or more storage devices or one storage device. In this case (in a case where the storage unit is constructed by one storage device), each transmission line is connected to the common storage device. In addition, in this embodiment, description has been given of two transmission lines, but three or more transmission lines may be provided. In addition, the controller and the IO device are provided in each of the transmission lines, and the transmission lines are connected to individual storage devices or a common storage device as an example.

In the related art, in high-speed transmission between devices (for example, high-speed transmission as in PCIe), it is difficult to perform appropriate sign monitoring during system operation, and it is difficult to perform appropriate adjustment of the transmission parameter during system operation. According to this, it is considered that there is room for an improvement from the viewpoint of deterioration of performance or redundancy of a system as a whole. In contrast, according to the technology of this embodiment, it is possible to perform appropriate sign monitoring (that is, the sign of occurrence of a failure or detection of the failure) during system operation by using the internal eye value, and in addition to this, since the transmission parameter is appropriately adjusted in correspondence with a situation during system operation, there is an advantage that maintenance of transmission quality can be realized, and deterioration of performance or redundancy during system operation can be suppressed.

In addition, in a case where a difference (that is, a difference in standard correspondence between devices mounted on a substrate) is present in device standards, only a standard transmission parameter having no difference between the devices (for example, a value related to emphasis or equalizer) can be set (adjusted). Accordingly, in the related art, in a device which does not cope with change of the emphasis or equalizer, or for which the change is not recommended, it is considered that appropriate sign monitoring may not be performed and the transmission parameter may not be appropriately adjusted in some cases. In contrast, according to this embodiment, it is possible to perform appropriate sign monitoring and it is possible to appropriately adjust the transmission parameter by using the internal eye value.

Hereinbefore, the embodiment has been described, but the invention is not limited to the above-described embodiment, and includes various modifications. For example, addition, deletion, or substitution of another configuration can be made with respect to a part of the configuration of the embodiment.

As an example of the processor, the CPU is considered, but another semiconductor device (for example, GPU) may be employed as long as the other semiconductor device is a main body that executes predetermined processes.

What is claimed is:

1. A transmission control method for improving suppression of transmission control signal deterioration, comprising:
   determining, via a first controller, transmission performance in a transmission line, between the first controller and a first IO device, by using a parameter that determines a size of an opening of an eye pattern;
   determining if the size is equal to or greater than a first reference value;
   on a condition that the size is equal to or greater than the first reference value, determining if the size is smaller than a second reference value;
   on a condition that the size is smaller than the second reference value, adjusting a transmission parameter, that is a parameter having an influence on transmission quality in the transmission line, such that the transmission parameter is smaller than the first reference value;
   sending, to a second controller, a signal and receiving from the second controller, a return signal including an operation status of the second controller;
   executing, via the first controller, a transmission process;
   adjusting, via the first controller, the transmission parameter, such that an internal eye value is less than the first reference value and the transmission control signal deterioration is suppressed; and
   sending, via the first controller to the second controller, a second signal, and stops the execution of the transmission process,
   wherein a period set by a user is changed to be lengthened in correspondence with the number of times of adjustment of the transmission parameter.

2. The transmission control method according to claim 1, wherein the parameter that determines the size of the opening of the eye pattern is determined on the basis of a height of the opening and a width of the opening.

3. The transmission control method according to claim 1, in a case where the size is equal to or greater than the second reference value, the first controller determines a failure state.

4. The transmission control method according to claim 3, wherein in a case where the failure state is determined, the first controller determines if a size of the opening of the eye pattern on the second controller side is smaller than the second reference value or equal to or less than the second reference value, adjustment of the transmission parameter is not performed, and a user is notified of the determination.

5. A non-transitory computer-readable medium storing a program for improving suppression of transmission control signal deterioration, that when executed by a first processor causes the first processor to:

determine transmission performance in a transmission line, between the first processor and a first TO device, by using a parameter that determines a size of an opening of an eye pattern;

determine if the size is equal to or greater than a first reference value;

on a condition that the size is equal to or greater than the first reference value, determine if the size is smaller than a second reference value;

on a condition that the size is smaller than the second reference value, adjust a transmission parameter that is a parameter having an influence on transmission quality in the transmission line, such that the transmission parameter is smaller than the first reference value;

send, to a second processor, a signal and receiving from the second processor, a return signal including an operation status of the second processor;

execute, via the first processor, a transmission process;

adjust, via the first processor, the transmission parameter, such that an internal eye value is less than the first reference value and the transmission control signal deterioration is suppressed; and send, via the first processor to the second processor, a second signal, and stops the execution of the transmission process, wherein a period set by a user is changed to be lengthened in correspondence with the number of times of adjustment of the transmission parameter.

6. A transmission control system for improving suppression of transmission control signal deterioration, comprising:

a storage unit;
an TO device; and
a first controller connected to a first transmission line that connects a host as a higher-level device, the TO device, and the storage unit, wherein the first controller,
executes an adjustment processing program,
determines transmission performance in the first transmission line by using a parameter that determines a size of an opening of an eye pattern,
determines if the size is equal to or greater than a first reference value,
on a condition that the size is equal to or greater than the first reference value, determines if the size is smaller than a second reference value,
on a condition that the size is smaller than the second reference value, adjusts a transmission parameter that is a parameter having an influence on transmission quality in the first transmission line, such that the transmission parameter is smaller than the first reference value,
send, to a second controller, a signal and receive from the second controller, a return signal including an operation status of the second controller,
execute a transmission process,
adjust, via the first controller, the transmission parameter, such that an internal eye value is less than the first reference value and the transmission control signal deterioration is suppressed, and
send, via the first controller to the second controller, a second signal, and stops the execution of the transmission process, and wherein a period set by a user is changed by the first controller to be lengthened in correspondence with the number of times of adjustment of the transmission parameter.

7. The transmission control system according to claim 6, further comprising:

the second controller connected to a second transmission line that connects the host and the storage unit, wherein the first controller and the second controller are capable of communicating with each other, the second controller,
executes an adjustment processing program,
determines transmission performance in the second transmission line by using a parameter that determines the size of the opening of the eye pattern, and
is capable of adjusting the transmission parameter that is a parameter having an influence on transmission quality in the second transmission line on the basis of a result of the determination, and the first controller,
stops data transmission in the first transmission line after confirming that the second controller does not adjust the transmission parameter, and
resumes the data transmission in the first transmission line after adjusting the transmission parameter.

8. The transmission control system according to claim 6, wherein in a case where the size is equal to or greater than the second reference value, the first controller determines a failure state.

9. The transmission control system according to claim 8, wherein the first controller is connected to a service processor, and is capable of communicating with the service processor, and in a case where the failure state is determined, the first controller determines if a size of the opening of the eye pattern on the second controller side is smaller than the second reference value or equal to or less than the second reference value, the first controller notifies the service processor of the determination without performing adjustment of the transmission parameter.

10. The transmission control system according to claim 6, wherein the first controller, executes an autonomous control processing program, and performs the determination in accordance with execution of the adjustment processing program in the period.

* * * * *